United States Patent
Feng et al.

(10) Patent No.: US 9,082,023 B2
(45) Date of Patent: Jul. 14, 2015

(54) METHOD FOR OPERATING A LASER SCANNER

(71) Applicant: Hand Held Products, Inc., Fort Mill, SC (US)

(72) Inventors: Chen Feng, Snohomish, WA (US); Kevin Saber, Sewell, NJ (US)

(73) Assignee: Hand Held Products, Inc., Fort Mill, SC (US)

( * ) Notice: Subject to any disclaimer, the term of this patent is extended or adjusted under 35 U.S.C. 154(b) by 128 days.

(21) Appl. No.: 14/018,729

(22) Filed: Sep. 5, 2013

(65) Prior Publication Data

US 2015/0060544 A1    Mar. 5, 2015

(51) Int. Cl.
*G06K 7/10*    (2006.01)
*G06K 7/00*    (2006.01)

(52) U.S. Cl.
CPC .................. *G06K 7/0095* (2013.01)

(58) Field of Classification Search
CPC .......... G06K 7/10594; G06K 7/10732; G06K 7/10851
USPC ............... 235/454, 462.01–462.49
See application file for complete search history.

(56) References Cited

U.S. PATENT DOCUMENTS

| | | | |
|---|---|---|---|
| 6,832,725 B2 | 12/2004 | Gardiner et al. | |
| 7,128,266 B2 | 10/2006 | Zhu et al. | |
| 7,159,783 B2 | 1/2007 | Walczyk et al. | |
| 7,413,127 B2 | 8/2008 | Ehrhart et al. | |
| 7,726,575 B2 | 6/2010 | Wang et al. | |
| 8,294,969 B2 | 10/2012 | Plesko | |
| 8,317,105 B2 | 11/2012 | Kotlarsky et al. | |
| 8,322,622 B2 | 12/2012 | Liu | |
| 8,366,005 B2 | 2/2013 | Kotlarsky et al. | |
| 8,371,507 B2 | 2/2013 | Haggerty et al. | |
| 8,376,233 B2 | 2/2013 | Van Horn et al. | |
| 8,381,979 B2 | 2/2013 | Franz | |
| 8,390,909 B2 | 3/2013 | Plesko | |
| 8,408,464 B2 | 4/2013 | Zhu et al. | |
| 8,408,468 B2 | 4/2013 | Horn et al. | |
| 8,408,469 B2 | 4/2013 | Good | |
| 8,424,768 B2 | 4/2013 | Rueblinger et al. | |
| 8,448,863 B2 | 5/2013 | Xian et al. | |
| 8,457,013 B2 | 6/2013 | Essinger et al. | |
| 8,459,557 B2 | 6/2013 | Havens et al. | |

(Continued)

FOREIGN PATENT DOCUMENTS

| | | |
|---|---|---|
| WO | 2013163789 A1 | 11/2013 |
| WO | 2013173985 A1 | 11/2013 |
| WO | 2014019130 A1 | 2/2014 |

OTHER PUBLICATIONS

U.S. Appl. No. 14/274,858 for Mobile Printer With Optional Battery Accessory, filed May 12, 2014, (Marty et al.), 26 pages.

(Continued)

*Primary Examiner* — Jamara Franklin
(74) *Attorney, Agent, or Firm* — Additon, Higgins & Pendleton, P.A.

(57) ABSTRACT

A method for operating an indicia reader such as a laser scanner is provided. The method affords a simplified technique for monitoring the offset between the drive frequency and the resonant oscillation frequency of the laser scanner. The phase offset between the drive frequency and the sense frequency is monitored to derive the drive frequency's offset from the resonant oscillation frequency.

13 Claims, 2 Drawing Sheets

(56) References Cited

U.S. PATENT DOCUMENTS

| | | |
|---|---|---|
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van Horn et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein |
| 8,561,905 B2 | 10/2013 | Edmonds et al. |
| 8,565,107 B2 | 10/2013 | Pease et al. |
| 8,571,307 B2 | 10/2013 | Li et al. |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 2007/0063048 A1 | 3/2007 | Havens et al. |
| 2008/0185432 A1 | 8/2008 | Caballero et al. |
| 2009/0134221 A1 | 5/2009 | Zhu et al. |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2011/0169999 A1 | 7/2011 | Grunow et al. |
| 2011/0202554 A1 | 8/2011 | Powilleit et al. |
| 2012/0111946 A1 | 5/2012 | Golant |
| 2012/0138685 A1 | 6/2012 | Qu et al. |
| 2012/0168511 A1 | 7/2012 | Kotlarsky et al. |
| 2012/0168512 A1 | 7/2012 | Kotlarsky et al. |
| 2012/0193407 A1 | 8/2012 | Barten |
| 2012/0193423 A1 | 8/2012 | Samek |
| 2012/0203647 A1 | 8/2012 | Smith |
| 2012/0223141 A1 | 9/2012 | Good et al. |
| 2012/0228382 A1 | 9/2012 | Havens et al. |
| 2012/0248188 A1 | 10/2012 | Kearney |
| 2013/0043312 A1 | 2/2013 | Van Horn |
| 2013/0056285 A1 | 3/2013 | Meagher |
| 2013/0070322 A1 | 3/2013 | Fritz et al. |
| 2013/0075168 A1 | 3/2013 | Amundsen et al. |
| 2013/0082104 A1 | 4/2013 | Kearney et al. |
| 2013/0175341 A1 | 7/2013 | Kearney et al. |
| 2013/0175343 A1 | 7/2013 | Good |
| 2013/0200158 A1 | 8/2013 | Feng et al. |
| 2013/0214048 A1 | 8/2013 | Wilz |
| 2013/0256418 A1 | 10/2013 | Havens et al. |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0278425 A1 | 10/2013 | Cunningham et al. |
| 2013/0287258 A1 | 10/2013 | Kearney |
| 2013/0292474 A1 | 11/2013 | Xian et al. |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306730 A1 | 11/2013 | Brady et al. |
| 2013/0306731 A1 | 11/2013 | Pedraro |
| 2013/0306734 A1 | 11/2013 | Xian et al. |
| 2013/0307964 A1 | 11/2013 | Bremer et al. |
| 2013/0308625 A1 | 11/2013 | Corcoran |
| 2013/0313324 A1 | 11/2013 | Koziol et al. |
| 2013/0313325 A1 | 11/2013 | Wilz et al. |
| 2013/0313326 A1 | 11/2013 | Ehrhart |
| 2013/0327834 A1 | 12/2013 | Hennick et al. |
| 2013/0341399 A1 | 12/2013 | Xian et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008430 A1 | 1/2014 | Soule et al. |
| 2014/0008439 A1 | 1/2014 | Wang |
| 2014/0021256 A1 | 1/2014 | Qu et al. |
| 2014/0025584 A1 | 1/2014 | Liu et al. |
| 2014/0027518 A1 | 1/2014 | Edmonds et al. |
| 2014/0034723 A1 | 2/2014 | Van Horn et al. |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0061305 A1 | 3/2014 | Nahill et al. |
| 2014/0061306 A1 | 3/2014 | Wu et al. |
| 2014/0061307 A1 | 3/2014 | Wang et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0075846 A1 | 3/2014 | Woodburn |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |

(56) References Cited

U.S. PATENT DOCUMENTS

| | | |
|---|---|---|
| 2014/0084068 A1 | 3/2014 | Gillet et al. |
| 2014/0086348 A1 | 3/2014 | Peake et al. |
| 2014/0097249 A1 | 4/2014 | Gomez et al. |
| 2014/0098284 A1 | 4/2014 | Oberpriller et al. |
| 2014/0098792 A1 | 4/2014 | Wang et al. |
| 2014/0100774 A1 | 4/2014 | Showering |
| 2014/0100813 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |
| 2014/0104451 A1 | 4/2014 | Todeschini et al. |
| 2014/0106594 A1 | 4/2014 | Skvoretz |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0121438 A1 | 5/2014 | Kearney |
| 2014/0121445 A1 | 5/2014 | Ding et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131441 A1 | 5/2014 | Nahill et al. |
| 2014/0133379 A1 | 5/2014 | Wang et al. |
| 2014/0140585 A1 | 5/2014 | Wang |
| 2014/0151453 A1 | 6/2014 | Meier et al. |
| 2014/0160329 A1 | 6/2014 | Ren et al. |

OTHER PUBLICATIONS

U.S. Appl. No. 14/264,173 for Autofocus Lens System for Indicia Readers filed Apr. 29, 2014, (Ackley et al.), 39 pages.

U.S. Appl. No. 14/230,322 for Focus Module and Components with Actuator filed Mar. 31, 2014 (Feng et al.); 92 pages.

U.S. Appl. No. 14/222,994 for Method and Apparatus for Reading Optical Indicia Using a Plurality of Data filed Mar. 24, 2014 (Smith et al.); 30 pages.

U.S. Appl. No. 14/231,898 for Hand-Mounted Indicia-Reading Device with Finger Motion Triggering filed Apr. 1, 2014 (Van Horn et al.); 36 pages.

U.S. Appl. No. 29/486,759 for an Imaging Terminal, filed Apr. 2, 2014 (Oberpriller et al.); 8 pages.

U.S. Appl. No. 29/436,337 for an Electronic Device, filed Nov. 5, 2012 (Fitch et al.); 19 pages.

U.S. Appl. No. 29/458,405 for an Electronic Device, filed Jun. 19, 2013 (Fitch et al.); 22 pages.

U.S. Appl. No. 29/459,620 for an Electronic Device Enclosure, filed Jul. 2, 2013 (London et al.); 21 pages.

U.S. Appl. No. 29/459,681 for an Electronic Device Enclosure, filed Jul. 2, 2013 (Chaney et al.); 14 pages.

U.S. Appl. No. 29/459,785 for a Scanner and Charging Base, filed Jul. 3, 2013 (Fitch et al.); 21 pages.

U.S. Appl. No. 29/459,823 for a Scanner, filed Jul. 3, 2013 (Zhou et al.); 13 pages.

U.S. Appl. No. 29/468,118 for an Electronic Device Case, filed Sep. 26, 2013 (Oberpriller et al.); 44 pages.

U.S. Appl. No. 13/367,978, filed Feb. 7, 2012, (Feng et al.); now abandoned.

U.S. Appl. No. 13/736,139 for an Electronic Device Enclosure, filed Jan. 8, 2013 (Chaney); 40 pages.

U.S. Appl. No. 13/771,508 for an Optical Redirection Adapter, filed Feb. 20, 2013 (Anderson); 26 pages.

U.S. Appl. No. 13/780,356 for a Mobile Device Having Object Identification Interface, filed Feb. 28, 2013 (Samek et al.); 21 pages.

U.S. Appl. No. 13/852,097 for a System and Method for Capturing and Preserving Vehicle Event Data, filed Mar. 28, 2013 (Barker et al.); 20 pages.

U.S. Appl. No. 13/902,110 for a System and Method for Display of Information Using a Vehicle-Mount Computer, filed May 24, 2013 (Hollifield); 29 pages.

U.S. Appl. No. 13/902,144, for a System and Method for Display of Information Using a Vehicle-Mount Computer, filed May 24, 2013 (Chamberlin); 23 pages.

U.S. Appl. No. 13/902,242 for a System for Providing a Continuous Communication Link With a Symbol Reading Device, filed May 24, 2013 (Smith et al.); 24 pages.

U.S. Appl. No. 13/912,262 for a Method of Error Correction for 3D Imaging Device, filed Jun. 7, 2013 (Jovanovski et al.); 33 pages.

U.S. Appl. No. 13/912,702 for a System and Method for Reading Code Symbols at Long Range Using Source Power Control, filed Jun. 7, 2013 (Xian et al.); 24 pages.

U.S. Appl. No. 13/922,339 for a System and Method for Reading Code Symbols Using a Variable Field of View, filed Jun. 20, 2013 (Xian et al.); 23 pages.

U.S. Appl. No. 13/927,398 for a Code Symbol Reading System Having Adaptive Autofocus, filed Jun. 26, 2013 (Todeschini); 24 pages.

U.S. Appl. No. 13/930,913 for a Mobile Device Having an Improved User Interface for Reading Code Symbols, filed Jun. 28, 2013 (Gelay et al.); 24 pages.

U.S. Appl. No. 13/933,415 for an Electronic Device Case, filed Jul. 2, 2013 (London et al.); 47 pages.

U.S. Appl. No. 13/947,296 for a System and Method for Selectively Reading Code Symbols, filed Jul. 22, 2013 (Rueblinger et al.); 29 pages.

U.S. Appl. No. 13/950,544 for a Code Symbol Reading System Having Adjustable Object Detection, filed Jul. 25, 2013 (Jiang); 28 pages.

U.S. Appl. No. 13/961,408 for a Method for Manufacturing Laser Scanners, filed Aug. 7, 2013 (Saber et al.); 26 pages.

U.S. Appl. No. 14/018,729 for a Method for Operating a Laser Scanner, filed Sep. 5, 2013 (Feng et al.); 24 pages.

U.S. Appl. No. 14/019,616 for a Device Having Light Source to Reduce Surface Pathogens, filed Sep. 6, 2013 (Todeschini); 23 pages.

U.S. Appl. No. 14/023,762 for a Handheld Indicia Reader Having Locking Endcap, filed Sep. 11, 2013 (Gannon); 31 pages.

U.S. Appl. No. 14/035,474 for Augmented-Reality Signature Capture, filed Sep. 24, 2013 (Todeschini); 33 pages.

U.S. Appl. No. 14/047,896 for Terminal Having Illumination and Exposure Control filed Oct. 7, 2013 (Jovanovski et al.); 32 pages.

U.S. Appl. No. 14/053,175 for Imaging Apparatus Having Imaging Assembly, filed Oct. 14, 2013 (Barber); 39 pages.

U.S. Appl. No. 14/055,234 for Dimensioning System, filed Oct. 16, 2013 (Fletcher); 26 pages.

U.S. Appl. No. 14/053,314 for Indicia Reader, filed Oct. 14, 2013 (Huck); 29 pages.

U.S. Appl. No. 14/065,768 for Hybrid System and Method for Reading Indicia, filed Oct. 29, 2013 (Meier et al.); 22 pages.

U.S. Appl. No. 14/074,746 for Self-Checkout Shopping System, filed Nov. 8, 2013 (Hejl et al.); 26 pages.

U.S. Appl. No. 14/074,787 for Method and System for Configuring Mobile Devices via NFC Technology, filed Nov. 8, 2013 (Smith et al.); 28 pages.

U.S. Appl. No. 14/087,190 for Optimal Range Indicators for Bar Code Validation, filed Nov. 22, 2013 (Hejl); 27 pages.

U.S. Appl. No. 14/345,735 for Optical Indicia Reading Terminal with Combined Illumination filed Mar. 19, 2014 (Ouyang); 19 pages.

U.S. Appl. No. 14/101,965 for High Dynamic-Range Indicia Reading System, filed Dec. 10, 2013 (Xian); 28 pages.

U.S. Appl. No. 14/118,400 for Indicia Decoding Device with Security Lock, filed Nov. 18, 2013 (Liu); 28 pages.

U.S. Appl. No. 14/150,393 for Incicia-reader Having Unitary Construction Scanner, filed Jan. 8, 2014 (Colavito et al.); 28 pages.

U.S. Appl. No. 14/154,207 for Laser Barcode Scanner, filed Jan. 14, 2014 (Hou et al.); 26 pages.

U.S. Appl. No. 14/154,915 for Laser Scanning Module Employing a Laser Scanning Assembly having Elastomeric Wheel Hinges, filed Jan. 14, 2014 (Havens et al.); 24 pages.

(56) References Cited

OTHER PUBLICATIONS

U.S. Appl. No. 14/158,126 for Methods and Apparatus to Change a Feature Set on Data Collection Devices, filed Jan. 17, 2014 (Berthiaume et al.); 53 pages.

U.S. Appl. No. 14/342,551 for Terminal Having Image Data Format Conversion filed Mar. 4, 2014 (Lui et al.); 25 pages.

U.S. Appl. No. 14/342,544 for Imaging Based Barcode Scanner Engine with Multiple Elements Supported on a Common Printed Circuit Board filed Mar. 4, 2014 (Liu et al.); 27 pages.

U.S. Appl. No. 14/257,174 for Reading Apparatus Having Partial Frame Operating Mode filed Apr. 21, 2014, (Barber et al.), 67 pages.

U.S. Appl. No. 14/200,405 for Indicia Reader for Size-Limited Applications filed Mar. 7, 2014 (Feng et al.); 42 pages.

U.S. Appl. No. 14/166,103 for Indicia Reading Terminal Including Optical Filter filed Jan. 28, 2014 (Lu et al.); 29 pages.

100 ⟶

110 — Provide a laser scanner that includes (*i*) an indicia-capturing subsystem for acquiring information about indicia within the indicia-capturing subsystem's field of view, the indicia-capturing subsystem including a light-deflecting assembly having a resonant oscillation frequency, and the indicia-capturing subsystem including a sense winding for generating a sense frequency associated with oscillation of the light-deflecting assembly, and (*ii*) an indicia-decoding processor for decoding indicia information.

120 — Drive the indicia-capturing subsystem's light-deflecting assembly at a drive frequency.

130 — Monitor the sense frequency.

140 — Predict, based on the phase shift between the drive frequency and the sense frequency, the resonant oscillation frequency of the indicia-capturing subsystem's light-deflecting assembly.

150 — Provide a laser scanner that includes (*i*) an indicia-capturing subsystem for acquiring information about indicia within the indicia-capturing subsystem's field of view, the indicia-capturing subsystem including a light-deflecting assembly having a resonant oscillation frequency, and the indicia-capturing subsystem including a sense winding for generating a sense frequency associated with oscillation of the light-deflecting assembly, and (*ii*) an indicia-decoding processor for decoding indicia information.

160 — Drive the indicia-capturing subsystem's light-deflecting assembly at a drive frequency.

170 — Detect phase offset, if any, between the drive frequency and the sense frequency.

*FIG. 2*

METHOD FOR OPERATING A LASER SCANNER

FIELD OF THE INVENTION

The present invention relates to indicia readers. More particularly, the present invention relates to a method of operating laser scanners.

BACKGROUND

Laser scanners are widely-used devices for decoding machine-readable indicia such as barcodes. Laser scanners typically operate by sweeping a laser beam across the laser scanner's field of view. If the field of view contains indicia (e.g., an indicium), the laser scanner receives the laser light that is reflected off the indicia and converts the optical signal into an electrical signal that can be decoded by the laser scanner.

To achieve the effect of sweeping the laser across the field of view, the laser scanner typically has a laser source directing a laser beam at an oscillating light-deflecting assembly. The light-deflecting assembly has a resonant oscillation frequency. Typically, it is desirable to drive the light-deflecting assembly at an oscillation frequency that is offset by some predetermined amount (e.g., 2 Hz, 0 Hz) from the resonant oscillation frequency. Achieving this desired offset has traditionally required repeated resonance testing of the light-deflecting assembly to determine its resonant frequency, which can change over time and temperature. This resonance testing technique can result in unwanted variation in selected drive frequency due to variation in the resonant frequency check method.

Therefore, a need exists for a method for operating an indicia reader that provides for a simplified, yet effective, technique of monitoring the relationship between the drive frequency and the resonant oscillation frequency of the light-deflecting assembly.

SUMMARY

Accordingly, in one aspect, the present invention embraces a method for operating an indicia reader. A laser scanner is provided that includes an indicia-capturing subsystem for acquiring information about indicia within the indicia-capturing subsystem's field of view. The indicia-capturing subsystem includes a light-deflecting assembly having a resonant oscillation frequency. The indicia-capturing subsystem also includes a sense mechanism (e.g., sense winding) for generating a sense frequency associated with oscillation of the light-deflecting assembly. The laser scanner also includes an indicia-decoding processor for decoding indicia information. The indicia-capturing subsystem's light-deflecting assembly is driven at a drive frequency. The sense frequency of the indicia-capturing subsystem's light-deflecting assembly is monitored. The resonant oscillation frequency of the indicia-capturing subsystem's light-deflecting assembly is predicted based on the phase shift between the drive frequency and the sense frequency.

In an alternative embodiment, the step of predicting the resonant oscillation frequency of the indicia-capturing subsystem's light-deflecting assembly includes correlating the phase shift between the drive frequency and the sense frequency against established resonant-oscillation-frequency-offset values for the indicia-capturing subsystem's light-deflecting assembly.

In another embodiment, the method includes the step of monitoring the drive frequency of the indicia-capturing subsystem's light-deflecting assembly.

In yet another embodiment, the method includes the step of adjusting the drive frequency in response to the predicted resonant oscillation frequency of the indicia-capturing subsystem's light-deflecting assembly.

In yet another embodiment, the step of adjusting the drive frequency includes driving the indicia-capturing subsystem's light-deflecting assembly at an adjusted drive frequency that is closer to the predicted resonant oscillation frequency of the indicia-capturing subsystem's light-deflecting assembly.

In yet another embodiment, the step of adjusting the drive frequency includes driving the indicia-capturing subsystem's light-deflecting assembly at an adjusted drive frequency that is substantially the same as the predicted resonant oscillation frequency of the indicia-capturing subsystem's light-deflecting assembly.

In another aspect, the present invention embraces a method for operating an indicia reader where a laser scanner is provided that includes (i) an indicia-capturing subsystem for acquiring information about indicia within the indicia-capturing subsystem's field of view, the indicia-capturing subsystem including a light-deflecting assembly having a resonant oscillation frequency, and the indicia-capturing subsystem including a sense mechanism for generating a sense frequency associated with oscillation of the light-deflecting assembly, and (ii) an indicia-decoding processor for decoding indicia information. The indicia-capturing subsystem's light-deflecting assembly is driven at a drive frequency. Phase offset, if any, between the drive frequency and the sense frequency is detected.

In an alternative embodiment, the step of detecting phase offset between the drive frequency and the sense frequency includes monitoring the phase offset between the drive frequency and the sense frequency.

In another embodiment, the drive frequency is adjusted in response to phase offset between the drive frequency and the sense frequency.

In yet another embodiment, the step of adjusting the drive frequency includes modifying the drive frequency at which the indicia-capturing subsystem's light-deflecting assembly is driven to reduce the phase offset between the drive frequency and the sense frequency to a desired phase-offset setpoint.

In yet another embodiment, the resonant oscillation frequency of the indicia-capturing subsystem's light-deflecting assembly is determined based upon the phase offset between the drive frequency and the sense frequency.

In yet another embodiment, the drive frequency of the indicia-capturing subsystem's light-deflecting assembly is monitored.

In yet another embodiment, the sense frequency of the indicia-capturing subsystem's light-deflecting assembly is monitored.

The foregoing illustrative summary, as well as other exemplary objectives and/or advantages of the invention, and the manner in which the same are accomplished, are further explained within the following detailed description and its accompanying drawings.

DETAILED DESCRIPTION

Figure 1:
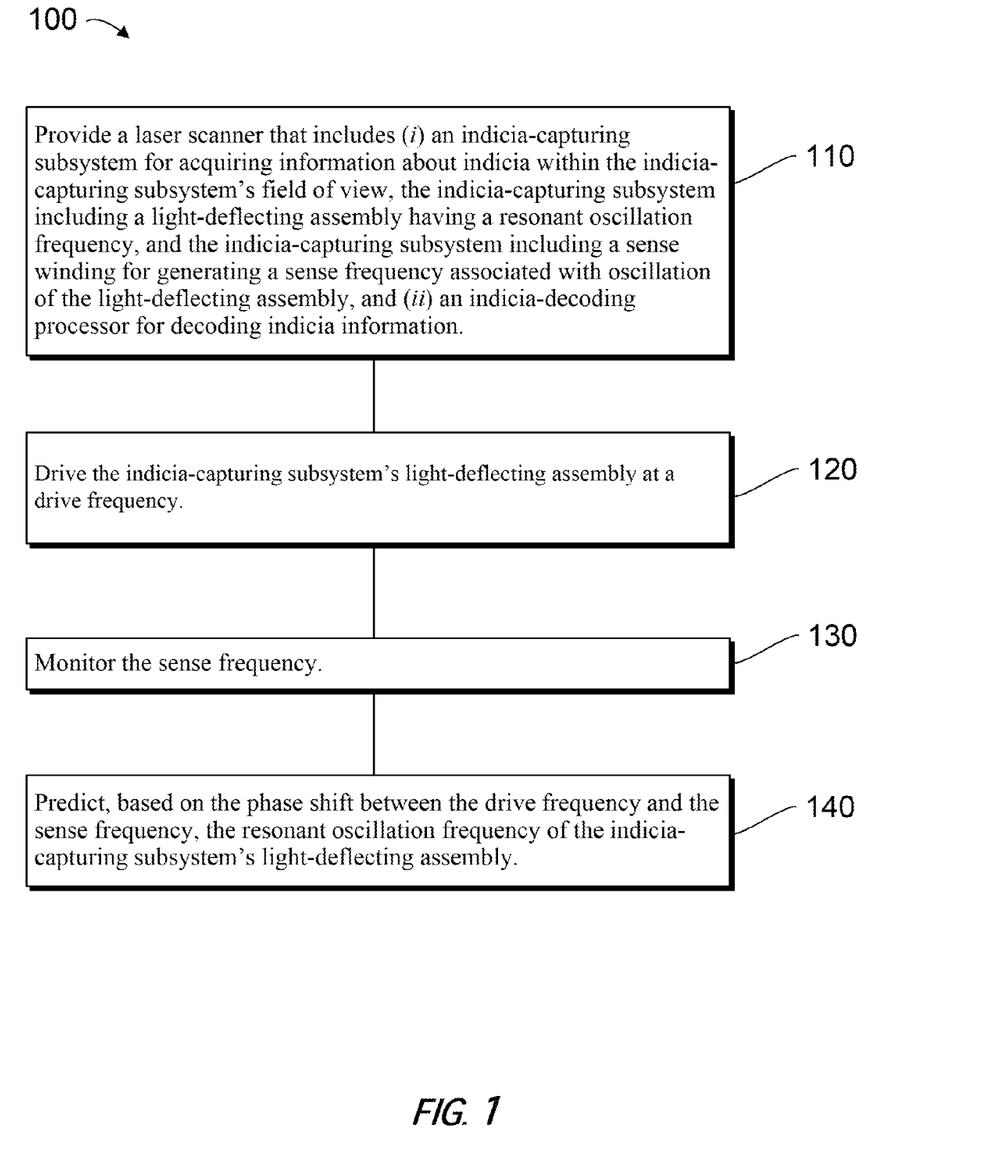
FIG. 1 is a flow chart illustrating an exemplary method for operating an indicia reader according to the present invention.

The present invention embraces a method for operating an indicia reader. Typically, the indicia reader is a laser scanner capable of scanning (e.g., reading) machine-readable indicia, such as barcodes, matrix codes, QR codes, etc. The method may apply to any indicia reader that utilizes a drive frequency to oscillate a light-deflecting assembly. The laser scanner may be a fixed-position scanner or a handheld scanner. Referring now to FIG. 1, an exemplary embodiment of the method 100 according to the present invention is illustrated where a laser scanner is provided 110. The laser scanner typically includes an indicia-capturing subsystem for acquiring information about indicia within the indicia-capturing subsystem's field of view. The indicia-capturing subsystem typically includes a light source such as a visible laser diode, and operates by sweeping a light beam (e.g., laser beam) across a field of view containing the indicia.

The kind of laser scanner that is embraced by the method according to the present invention achieves the sweeping action of the laser beam across the field of view by projecting a laser beam from a laser source onto a light-deflecting assembly. Typically the light-deflecting assembly includes a mirror to reflect the laser beam in the desired manner, but it may also include a light diffractive element such as a reflection or transmission hologram (i.e., HOE), a light-refractive element such as a lens element, or any other kind of optical element capable of deflecting a laser beam along an optical path. The light-deflecting assembly typically also includes a permanent magnet. Typically the mirror and permanent magnet are mounted to a scanning element (e.g., flipper) using an adhesive or another suitable fastening technique (e.g., soldering) 110.

Typically, the light-deflecting assembly is forced into oscillatory motion (e.g., vibration) by driving an electromagnetic coil with a voltage signal having a frequency (i.e., drive frequency). Typically, the electromagnetic coil is driven in a push-pull mode in which the magnetic polarity of the coil reverses periodically at a rate determined by the amplitude variation of the voltage signal applied across the terminals of the electromagnetic coil. It will be appreciated by those having ordinary skill in the art that other techniques exist for oscillating the light-deflecting assembly of a laser scanner (e.g., electrodes). The method according to the present invention is not limited to scanners adopting any particular drive method. Rather, the method according to the present invention applies broadly to all laser scanners (or other scanners that operate by sweeping a light beam across a field-of-view that includes an indicium) that incorporate an oscillating light-deflecting assembly.

The laser scanner includes a photoreceptor (e.g., photodiode) that receives the light that reflects and/or scatters off the indicia as an optical signal; the laser scanner converts the optical signal into an electrical signal representing indicia information that can be read (e.g., decoded) by the laser scanner's indicia-decoding processor (e.g., computer processor) 110.

According to the method 100 embraced by the present invention, the indicia-capturing subsystem's light-deflecting assembly is driven at a drive frequency 120. Typically, upon startup or entering scan mode, the drive frequency is set at a predetermined, initial drive frequency (e.g., the default drive frequency). Typically, the initial drive frequency will be set at or near the predicted resonant oscillation frequency of the light-deflecting assembly. In general, the closer that a light-deflecting assembly is driven to its resonant oscillation frequency, the greater the efficiency (e.g., the less power required to drive the light-deflecting assembly). Typically, the hinge(s) (e.g., torsional hinges) that connect the light-deflecting assembly to a supporting structure act as torsional springs that resist deflection or rotation forces to return the light-deflecting assembly to its centered position. If the light-deflecting assembly is continuously driven at or near its resonant oscillation frequency, the deflection amplitude of the light-deflecting assembly can increase to a very wide angle. To a degree, this effect is advantageous, because it permits oscillation of the light-deflecting assembly over a large angle with a relatively low-power drive signal (e.g., lower voltage). If the deflection amplitude of the light-deflection assembly becomes too great, however, the hinges or other components may become overstressed and fail, or the light-deflecting assembly may collide with other components within the laser scanner (a failure commonly known as a bang). To avoid such failures, some devices are configured such that the initial drive frequency differs (i.e., is offset) from the resonant frequency of the light-deflecting assembly.

Setting the initial drive frequency at or near the resonant oscillation frequency requires a determination of the resonant oscillation frequency for a given light-deflecting assembly. This process has traditionally involved periodic resonance testing of the light-deflecting assembly. Incorporating resonance testing capabilities into the laser scanner tends to increase system startup time and decrease the overall user experience. Furthermore, resonance testing can introduce variation to the drive frequency from indicia reader to indicia reader due to variations in the resonant frequency check method. This resultant variation in initial drive frequencies across indicia readers is undesirable because such indicia readers are typically designed to operate at about the same drive frequency. Accounting for differences in drive frequencies across indicia readers introduces complexities into the engineering process and can lead to decreased indicia-reader performance in the field.

In lieu of performing traditional resonance testing of the light-deflecting assembly, the method 100 according to the present invention relies upon the predicted phase relationship of the drive frequency and oscillation frequency of the light-deflecting assembly to determine resonance. Typically, the oscillation frequency of the light-deflecting assembly is detected by a sense mechanism that, in combination with the movement of the light-deflecting assembly, generates a sense frequency. The sense mechanism is typically a sense winding that includes a wire coil of a particular gauge placed around the drive winding. The sense winding picks up an induced voltage caused by changing flux within the coil as a result of the external magnetic field generated by the permanent magnet portion of the light-deflecting assembly's scanning element. As such, the sense frequency generated by the interaction between the sense winding and the moving light-deflecting assembly measures the oscillation frequency of the light-deflecting assembly.

According to the present method 100 for operating an indicia reader, the sense frequency of the indicia-capturing subsystem's light-deflecting assembly is monitored to determine its relationship with the drive frequency 130. Typically, for any given light-deflecting assembly, when the drive frequency is in phase with the sense frequency, the drive frequency is operating substantially at the resonant oscillation frequency of the light-deflecting assembly. Consequently, the resonant oscillation frequency of the indicia-capturing subsystem's light-deflecting assembly may be predicted based on the phase shift (e.g., phase offset) between the drive frequency and the sense frequency 140. For example, to drive the light-deflecting assembly closer to the resonant oscillation frequency, the drive frequency is adjusted to reduce the phase shift between the drive frequency and the sense frequency (e.g., make adjustments to bring the phase shift closer to 0 degrees). This results in an adjusted drive frequency that is closer to the predicted resonant oscillation frequency of the light-deflecting assembly.

In an alternative embodiment of the method 100 according to the present invention, the resonant oscillation frequency of the light-deflecting assembly is predicted by correlating the phase shift between the drive frequency and the sense frequency against established resonant-oscillation-frequency-offset values for the given light-deflecting assembly. Table 1 is an exemplary correlation table for an exemplary light-deflecting assembly. As shown in Table 1, for a given drive frequency, there is a corresponding phase shift representing the difference in phase, if any, between the drive frequency and the sense frequency. For example, when the drive frequency is set at 19.4 Hz for the exemplary light-deflecting assembly of Table 1, the corresponding phase shift between the drive frequency and sense frequency is 0.00 degrees. In other words, at a drive frequency of 19.4 Hz in this exemplary correlation table, the drive frequency and sense frequency are in phase (i.e., no phase shift), meaning that the drive frequency is operating at the resonant oscillation frequency of the light-deflecting assembly. The middle and right columns of Table 1 show the resonant-oscillation-frequency-offset values (measured in milliseconds and degrees, respectively) for the light-deflecting assembly exemplified in this correlation table. Typically, the resonant-oscillation-frequency-offset values for a given light-deflecting assembly are established by testing the phase shift at varying drive frequencies. Typically, the relevant resonant-oscillation-frequency-offset values for the laser scanner's light-deflecting assembly are stored in memory (e.g., non-volatile memory) so that they may be accessed during operation of the laser scanner.

An advantage of employing this correlation technique is that it allows for more precise determination of the appropriate drive setting to achieve the desired offset from the resonant oscillation frequency. For example and referring again to Table 1, if it is determined that the given light-deflecting assembly should be driven at a frequency that is 0.6 Hz from the resonant oscillation frequency, then the drive frequency should be maintained at the frequency that results in a phase shift of 24.92 degrees.

TABLE 1

A correlation table showing resonant-oscillation-frequency-offset values for an exemplary light-deflecting assembly.

| Drive Frequency (Hz) | Phase Shift (msec) | Phase Shift (deg) |
|---|---|---|
| 14.0 | 50.40 | −168.92 |
| 15.0 | 46.60 | −142.62 |
| 16.0 | 42.80 | −116.31 |
| 17.0 | 39.20 | −91.38 |
| 18.0 | 34.80 | −60.92 |
| 19.0 | 28.80 | −19.38 |
| 19.4 | 26.00 | 0.00 |

TABLE 1-continued

A correlation table showing resonant-oscillation-frequency-offset values for an exemplary light-deflecting assembly.

| Drive Frequency (Hz) | Phase Shift (msec) | Phase Shift (deg) |
|---|---|---|
| 20.0 | 22.40 | 24.92 |
| 21.0 | 17.60 | 58.15 |
| 22.0 | 14.40 | 80.31 |
| 23.0 | 12.40 | 94.15 |
| 24.0 | 11.60 | 99.69 |
| 25.0 | 10.80 | 105.23 |
| 26.0 | 10.40 | 108.00 |
| 27.0 | 9.60 | 113.54 |

Because the resonant oscillation frequency of a light-deflecting assembly can change over time (e.g., due to the effects of extreme temperatures and/or aging), it may be necessary to adjust the drive frequency to maintain the desired separation between the drive frequency and the resonant oscillation frequency. Rather than continually initiating a resonance test (e.g., upon system startup) that can affect the scanner's usability, the method 100 according to the present invention calls for the drive frequency to be adjusted in response to changes in the phase shift between the drive frequency and the sense frequency. So long as the phase shift is maintained at the appropriate offset, the drive frequency will be maintained at the desired offset from the resonant oscillation frequency, as predicted by the established resonant-oscillation-frequency-offset values for the given light-deflecting assembly. Similarly, should it be desirable to drive the light-deflecting assembly at substantially the same frequency as its resonant oscillation frequency, the drive frequency need only be adjusted so that the phase shift between the adjusted drive frequency and the sense frequency is about 0 degrees. To ensure the accuracy of the measurement of the phase shift, the drive frequency may be monitored as well.

Figure 2:
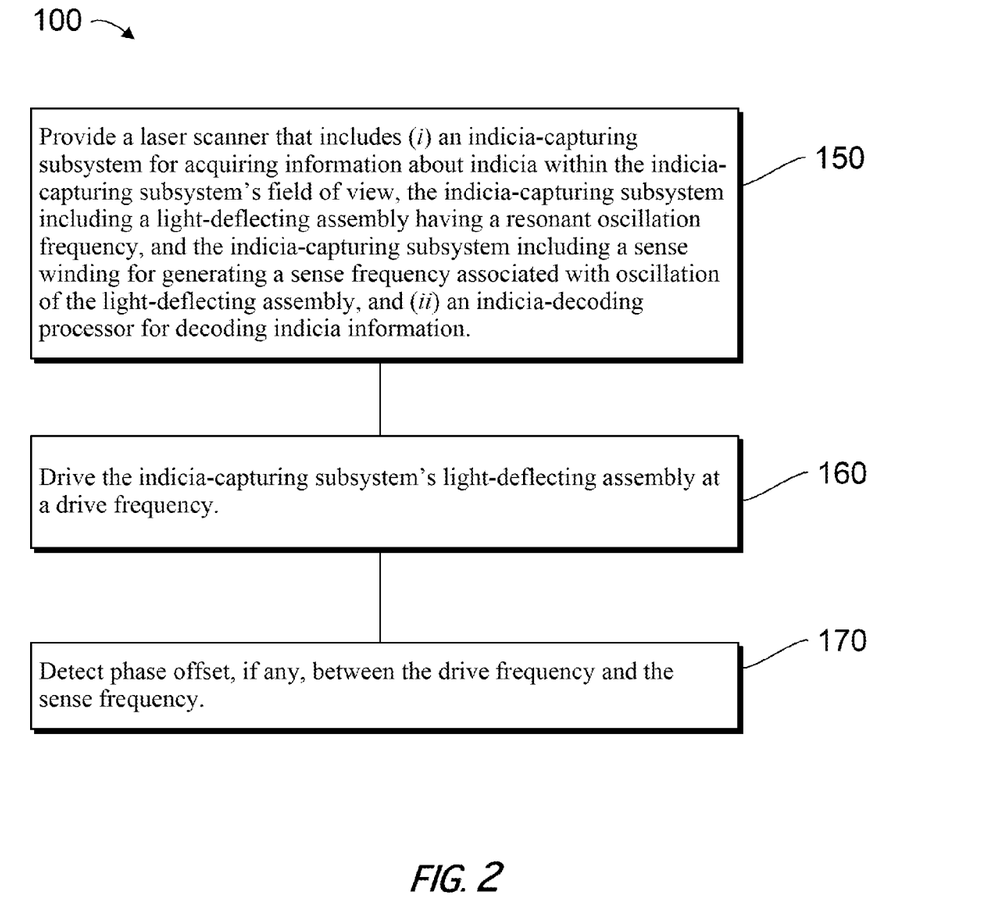
FIG. 2 is a flow chart illustrating an alternative exemplary method for operating an indicia reader according to the present invention.

Reference is now made to FIG. 2. In an alternative embodiment, the present invention embraces a method for operating an indicia reader in which a laser scanner is provided 150 and the light-deflecting assembly of the laser scanner is driven at a drive frequency 160. The phase offset, if any, between the drive frequency and the sense frequency is detected 170. The phase offset may be detected by monitoring the phase offset between the drive frequency and the sense frequency. The drive frequency may be adjusted by modifying the drive frequency to reduce the phase offset between the drive oscillation frequency and the sense frequency to a desired setpoint (e.g., 20 degrees). The resonant oscillation frequency of the light-deflecting assembly may be determined by adjusting the drive frequency until the drive frequency and sense frequency are in phase (i.e., until the phase offset is 0 degrees), at which point the drive frequency will be equal to the resonant oscillation frequency.

To supplement the present disclosure, this application incorporates entirely by reference the following patents, patent application publications, and patent applications: U.S. Pat. Nos. 6,832,725; 7,159,783; 7,128,266; 7,413,127; 7,726,575; 8,390,909; 8,294,969; 8,408,469; 8,408,468; 8,381,979; 8,408,464; 8,317,105; 8,366,005; 8,424,768; 8,322,622; 8,371,507; 8,376,233; 8,457,013; 8,448,863; 8,459,557; 8,469,272; 8,474,712; 8,479,992; 8,490,877; U.S. Patent Application Publication No. 2012/0111946; U.S. Patent Application Publication No. 2012/0223141; U.S. Patent Application Publication No. 2012/0193423; U.S. Patent Application Publication No. 2012/0203647; U.S. Patent Application Publication No. 2012/0248188; U.S. Patent Application Publication No. 2012/0228382; U.S. Patent Application Publication No. 2012/0193407; U.S. Patent Application Publication No. 2012/0168511; U.S. Patent Application Publication No. 2012/0168512; U.S. Patent Application Publication No. 2010/0177749; U.S. Patent Application Publication No. 2010/0177080; U.S. Patent Application Publication No. 2010/0177707; U.S. Patent Application Publication No. 2010/0177076; U.S. Patent Application Publication No. 2009/0134221; U.S. Patent Application Publication No. 2012/0318869; U.S. Patent Application Publication No. 2013/0043312; U.S. Patent Application Publication No. 2013/0068840; U.S. Patent Application Publication No. 2013/0070322; U.S. Patent Application Publication No. 2013/0075168; U.S. Patent Application Publication No. 2013/0056285; U.S. Patent Application Publication No. 2013/0075464; U.S. Patent Application Publication No. 2013/0082104; U.S. Patent Application Publication No. 2010/0225757; U.S. patent application Ser. No. 13/347,219 for an OMNIDIRECTIONAL LASER SCANNING BAR CODE SYMBOL READER GENERATING A LASER SCANNING PATTERN WITH A HIGHLY NON-UNIFORM SCAN DENSITY WITH RESPECT TO LINE ORIENTATION, filed Jan. 10, 2012 (Good); U.S. patent application Ser. No. 13/347,193 for a HYBRID-TYPE BIOPTICAL LASER SCANNING AND DIGITAL IMAGING SYSTEM EMPLOYING DIGITAL IMAGER WITH FIELD OF VIEW OVERLAPPING FIELD OF FIELD OF LASER SCANNING SUBSYSTEM, filed Jan. 10, 2012 (Kearney et al.); U.S. patent application Ser. No. 13/367,047 for LASER SCANNING MODULES EMBODYING SILICONE SCAN ELEMENT WITH TORSIONAL HINGES, filed Feb. 6, 2012 (Feng et al.); U.S. patent application Ser. No. 13/400,748 for a LASER SCANNING BAR CODE SYMBOL READING SYSTEM HAVING INTELLIGENT SCAN SWEEP ANGLE ADJUSTMENT CAPABILITIES OVER THE WORKING RANGE OF THE SYSTEM FOR OPTIMIZED BAR CODE SYMBOL READING PERFORMANCE, filed Feb. 21, 2012 (Wilz); U.S. patent application Ser. No. 13/432,197 for a LASER SCANNING SYSTEM USING LASER BEAM SOURCES FOR PRODUCING LONG AND SHORT WAVELENGTHS IN COMBINATION WITH BEAM-WAIST EXTENDING OPTICS TO EXTEND THE DEPTH OF FIELD THEREOF WHILE RESOLVING HIGH RESOLUTION BAR CODE SYMBOLS HAVING MINIMUM CODE ELEMENT WIDTHS, filed Mar. 28, 2012 (Havens et al.); U.S. patent application Ser. No. 13/492,883 for a LASER SCANNING MODULE WITH ROTATABLY ADJUSTABLE LASER SCANNING ASSEMBLY, filed Jun. 10, 2012 (Hennick et al.); U.S. patent application Ser. No. 13/367,978 for a LASER SCANNING MODULE EMPLOYING AN ELASTOMERIC U-HINGE BASED LASER SCANNING ASSEMBLY, filed Feb. 7, 2012 (Feng et al.); U.S. patent application Ser. No. 13/852,097 for a System and Method for Capturing and Preserving Vehicle Event Data, filed Mar. 28, 2013 (Barker et al.); U.S. patent application Ser. No. 13/780,356 for a Mobile Device Having Object-Identification Interface, filed Feb. 28, 2013 (Samek et al.); U.S. patent application Ser. No. 13/780,158 for a Distraction Avoidance System, filed Feb. 28, 2013 (Sauerwein); U.S. patent application Ser. No. 13/784,933 for an Integrated Dimensioning and Weighing System, filed Mar. 5, 2013 (McCloskey et al.); U.S. patent application Ser. No. 13/785,177 for a Dimensioning System, filed Mar. 5, 2013 (McCloskey et al.); U.S. patent application Ser. No. 13/780,196 for Android Bound Service Camera Initialization, filed Feb. 28, 2013 (Todeschini et al.); U.S. patent application Ser. No. 13/792,322 for a Replaceable Connector, filed Mar. 11, 2013 (Skvoretz); U.S. patent application Ser. No. 13/780,271 for a Vehicle Computer System with Transparent Display, filed Feb. 28, 2013 (Fitch et al.); U.S. patent application Ser. No. 13/736,139 for an Electronic Device Enclosure, filed Jan. 8, 2013 (Chaney); U.S. patent application Ser. No. 13/771,508 for an Optical Redirection Adapter, filed Feb. 20, 2013 (Anderson); U.S. patent application Ser. No. 13/750,304 for Measuring Object Dimensions Using Mobile Computer, filed Jan. 25, 2013; U.S. patent application Ser. No. 13/471,973 for Terminals and Methods for Dimensioning Objects, filed May 15, 2012; U.S. patent application Ser. No. 13/895,846 for a Method of Programming a Symbol Reading System, filed Apr. 10, 2013 (Corcoran); U.S. patent application Ser. No. 13/867,386 for a Point of Sale (POS) Based Checkout System Supporting a Customer-Transparent Two-Factor Authentication Process During Product Checkout Operations, filed Apr. 22, 2013 (Cunningham et al.); U.S. patent application Ser. No. 13/888,884 for an Indicia Reading System Employing Digital Gain Control, filed May 7, 2013 (Xian et al.); U.S. patent application Ser. No. 13/895,616 for a Laser Scanning Code Symbol Reading System Employing Multi-Channel Scan Data Signal Processing with Synchronized Digital Gain Control (SDGC) for Full Range Scanning, filed May 16, 2013 (Xian et al.); U.S. patent application Ser. No. 13/897,512 for a Laser Scanning Code Symbol Reading System Providing Improved Control over the Length and Intensity Characteristics of a Laser Scan Line Projected Therefrom Using Laser Source Blanking Control, filed May 20, 2013 (Brady et al.); U.S. patent application Ser. No. 13/897,634 for a Laser Scanning Code Symbol Reading System Employing Programmable Decode Time-Window Filtering, filed May 20, 2013 (Wilz, Sr. et al.); U.S. patent application Ser. No. 13/902,242 for a System For Providing A Continuous Communication Link With A Symbol Reading Device, filed May 24, 2013 (Smith et al.); U.S. patent application Ser. No. 13/902,144, for a System and Method for Display of Information Using a Vehicle-Mount Computer, filed May 24, 2013 (Chamberlin); U.S. patent application Ser. No. 13/902,110 for a System and Method for Display of Information Using a Vehicle-Mount Computer, filed May 24, 2013 (Hollifield); U.S. patent application Ser. No. 13/912,262 for a Method of Error Correction for 3D Imaging Device, filed Jun. 7, 2013 (Jovanovski et al.); U.S. patent application Ser. No. 13/912,702 for a System and Method for Reading Code Symbols at Long Range Using Source Power Control, filed Jun. 7, 2013 (Xian et al.); U.S. patent application Ser. No. 13/922,339 for a System and Method for Reading Code Symbols Using a Variable Field of View, filed Jun. 20, 2013 (Xian et al.); U.S. patent application Ser. No. 13/927,398 for a Code Symbol Reading System Having Adaptive Autofocus, filed Jun. 26, 2013 (Todeschini); U.S. patent application Ser. No. 13/930,913 for a Mobile Device Having an Improved User Interface for Reading Code Symbols, filed Jun. 28, 2013 (Gelay et al.); U.S. patent application Ser. No. 13/933,415 for an Electronic Device Case, filed Jul. 2, 2013 (London et al.); and U.S. patent application Ser. No. 13/947,296 for a System and Method for Selectively Reading Code Symbols, filed Jul. 22, 2013 (Rueblinger et al.).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale.

Unless otherwise noted, specific terms have been used in a generic and descriptive sense and not for purposes of limitation.

The invention claimed is:

1. A method for operating an indicia reader, comprising:
providing a laser scanner that includes (i) an indicia-capturing subsystem for acquiring information about indicia within the indicia-capturing subsystem's field of view, the indicia-capturing subsystem including a light-deflecting assembly having a resonant oscillation frequency, and the indicia-capturing subsystem including a sense mechanism for generating a sense frequency associated with oscillation of the light-deflecting assembly, and (ii) an indicia-decoding processor for decoding indicia information;
driving the indicia-capturing subsystem's light-deflecting assembly at a drive frequency;
monitoring the sense frequency; and
predicting, based on the phase shift between the drive frequency and the sense frequency, the resonant oscillation frequency of the indicia-capturing subsystem's light-deflecting assembly.

2. The method according to claim 1, wherein the step of predicting the resonant oscillation frequency of the indicia-capturing subsystem's light-deflecting assembly comprises correlating the phase shift between the drive frequency and the sense frequency against established resonant-oscillation-frequency-offset values for the indicia-capturing subsystem's light-deflecting assembly.

3. The method according to claim 1, comprising the step of monitoring the drive frequency of the indicia-capturing subsystem's light-deflecting assembly.

4. The method according to claim 1, comprising the step of adjusting the drive frequency in response to the predicted resonant oscillation frequency of the indicia-capturing subsystem's light-deflecting assembly.

5. The method according to claim 4, wherein the step of adjusting the drive frequency comprises driving the indicia-capturing subsystem's light-deflecting assembly at an adjusted drive frequency that is closer to the predicted resonant oscillation frequency of the indicia-capturing subsystem's light-deflecting assembly.

6. The method according to claim 4, wherein the step of adjusting the drive frequency comprises driving the indicia-capturing subsystem's light-deflecting assembly at an adjusted drive frequency that is substantially the same as the predicted resonant oscillation frequency of the indicia-capturing subsystem's light-deflecting assembly.

7. A method for operating an indicia reader, comprising:
providing a laser scanner that includes (i) an indicia-capturing subsystem for acquiring information about indicia within the indicia-capturing subsystem's field of view, the indicia-capturing subsystem including a light-deflecting assembly having a resonant oscillation frequency, and the indicia-capturing subsystem including a sense mechanism for generating a sense frequency associated with oscillation of the light-deflecting assembly, and (ii) an indicia-decoding processor for decoding indicia information;
driving the indicia-capturing subsystem's light-deflecting assembly at a drive frequency; and
detecting phase offset, if any, between the drive frequency and the sense frequency.

8. The method according to claim 7, wherein the step of detecting phase offset between the drive frequency and the sense frequency comprises monitoring the phase offset between the drive frequency and the sense frequency.

9. The method according to claim 7, comprising the step of adjusting the drive frequency in response to phase offset between the drive frequency and the sense frequency.

10. The method according to claim 9, wherein the step of adjusting the drive frequency comprises modifying the drive frequency at which the indicia-capturing subsystem's light-deflecting assembly is driven to reduce the phase offset between the drive frequency and the sense frequency to a desired phase-offset setpoint.

11. The method according to claim 7, comprising the step of determining the resonant oscillation frequency of the indicia-capturing subsystem's light-deflecting assembly based upon the phase offset between the drive frequency and the sense frequency.

12. The method according to claim 7, comprising the step of monitoring the drive frequency of the indicia-capturing subsystem's light-deflecting assembly.

13. The method according to claim 7, comprising the step of monitoring the sense frequency of the indicia-capturing subsystem's light-deflecting assembly.

* * * * *